Figure 1:
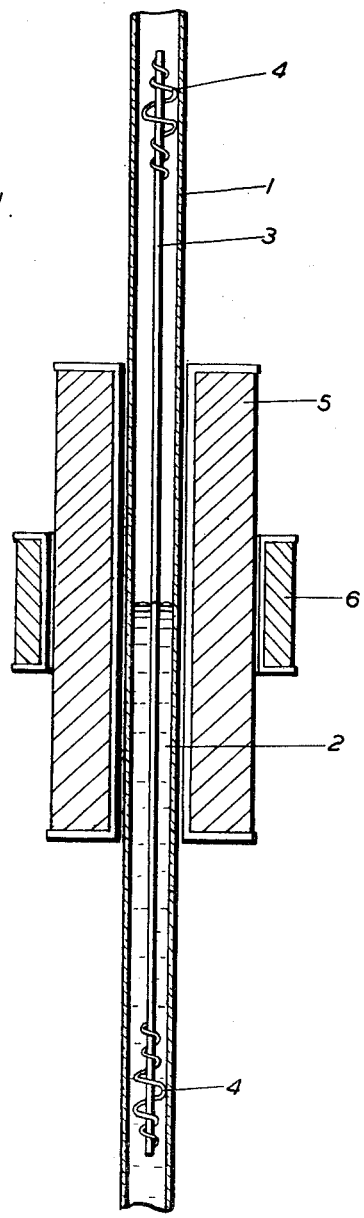

June 15, 1954    A. H. COCKETT    2,680,968
APPARATUS FOR DETERMINING THE POSITION
OF A MERCURY MENISCUS
Filed Feb. 15, 1952    2 Sheets-Sheet 1

INVENTOR
ALFRED H. COCKETT
BY
ATTORNEY

June 15, 1954　　　　A. H. COCKETT　　　2,680,968
APPARATUS FOR DETERMINING THE POSITION
　　　　　　　OF A MERCURY MENISCUS
Filed Feb. 15, 1952
　　　　　　　　　　　　　　　　2 Sheets-Sheet 2

INVENTOR
ALFRED H. COCKETT
BY
G. A. Diller
ATTORNEY

Patented June 15, 1954

2,680,968

UNITED STATES PATENT OFFICE 2,680,968

APPARATUS FOR DETERMINING THE POSITION OF A MERCURY MENISCUS

Alfred Horace Cockett, London, England, assignor to The British Oxygen Company Limited, London, England Application February 15, 1952, Serial No. 271,836

Claims priority, application Great Britain February 23, 1951

4 Claims. (Cl. 73—398)

This invention relates to apparatus for determining the position of an unloaded mercury meniscus which cannot be observed by visual means.

In certain cases, for example when the meniscus is subjected to a high static pressure, it is necessary for the mercury to be contained within a steel or other opaque tube of sufficient strength to withstand the internal pressure, and in such cases visual observation of the position of the mercury meniscus is not possible.

It is an object of the present invention to provide an apparatus of simple construction and high accuracy for determining the position of the meniscus within such an opaque container.

It is a further object to provide such an apparatus suitable for use when the meniscus is under high pressure and in which no mechanical motions or electrical connections have to be transmitted through the walls of the container.

It has now been found that if the mercury column within the container is made to act as a single-turn, short-circuited secondary winding of a transformer, the impedance of this secondary winding will vary with the length of the mercury column, that is, with the position of the meniscus within the container.

Since the effective impedance of the primary winding of a transformer includes part of the impedance of the secondary winding, a change in the latter will cause a corresponding change in the impedance of the primary winding. It has now been found that such change in the impedance of the primary winding can be correlated with the change in level of the meniscus. In order that the mercury column can function as the secondary winding, it is, of course, necessary that the container should be made of non-magnetic material.

According to the present invention therefore, apparatus for the determination of the position of a mercury meniscus within a non-magnetic container with reference to a predetermined level therein comprises a coil surrounding the container and carrying an alternating electric current and means for measuring the change in the impedance of the coil with change in the distance of the meniscus from the predetermined level.

In order to increase the sensitivity of the apparatus the container, which is preferably of tubular shape, may be provided with a core in the form of an iron wire of small diameter in comparison with the diameter of the container and fixed co-axially within the container. If desired, the wire may be painted or otherwise coated to protect it from corrosion provided that only a thin coating is used.

The means for measuring the changes in the impedance of the coil may conveniently comprise an A. C. bridge, the coil forming one arm of the bridge and the other three arms being impedances of fixed value. A change in the impedance of the coil is indicated by a change in the current in the galvanometer arm of the bridge. The current passing through the bridge must be constant and this may be obtained by any suitable means, such, for example, as a constant voltage transformer or a barretter. The frequency of alternation of the current supplied to the bridge may have any convenient value; for example, when an iron core is present, a current of a frequency of 50 cycles/second may be used. When such core is not used, however, it is necessary to increase the frequency of the current considerably in order to obtain a comparable sensitivity. A suitable frequency value would be 1000 cycles/second.

An amplifying device is preferably included in the detecting instrument of the bridge in order to increase the magnitude of the current passing therethrough.

In operation, the bridge is balanced so that no current flows through the detector instrument in the galvanometer arm when the mercury meniscus is at the predetermined level in the container. A displacement of the meniscus alters the inductance of the coil and this unbalances the bridge and causes a current to flow through the detector, the magnitude of the current being proportional to the amount of displacement of the meniscus from the predetermined level.

It may be found that the sensitivity of the apparatus is small for small displacements of the meniscus, increasing with increasing displacement. In such cases the sensitivity near the point of balance may be increased by surrounding the coil adjacent the predetermined level with a second smaller coil connected in series with the first. By similar means, the sensitivity of the apparatus may be increased over any desired part of its range. Alternatively, the sensitivity may be increased by increasing the diameter of the wire from which the coil is constructed provided that the number of turns of the coil is not reduced. This has the effect of increasing the ratio of inductance to resistance of the coil.

Figure 2:
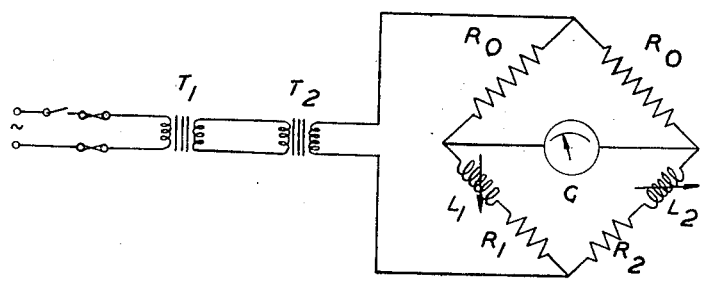
Figure 3:
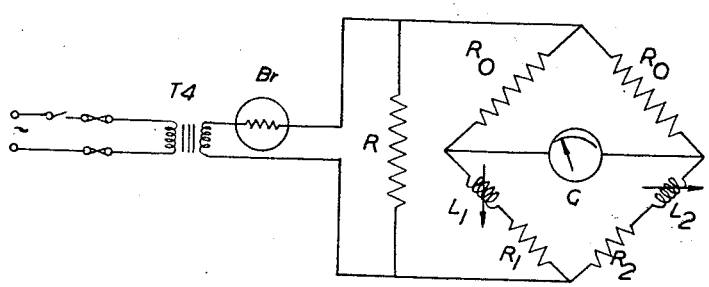

The apparatus of the present invention is particularly suitable for use with a differential manometer for the measurement of a differential pressure such as, for example, that due to the orifice of a flowmeter in a high-pressure system, and such an application will now be more particularly described with reference to the accompanying drawings, in which:

Figure 1 shows in longitudinal cross-section a portion of one limb of the differential manometer, embodying apparatus according to the present invention, and Figures 2 and 3 show two alternative electrical circuits for use with such manometer.

The manometer is of conventional construction consisting of a U-tube containing mercury, the mercury menisci in the two tubes being subject respectively to the two pressures whose difference is to be measured.

As shown in Figure 1, each limb of the manometer is in the form of a tube 1 containing a mercury column 2. An iron wire 3 is disposed co-axially within the tube 1 and held in position by spirals of iron wire 4.

Around the outside of the tube 1, but not necessarily on it, is wound a coil 5 of copper wire, the coil being of sufficient length to ensure that the mercury meniscus will under the operating conditions always be within it. A second coil 6 in series with coil 5 is wound round the outside of the latter, extending for a short distance on either side of the height within the tube 1 which the mercury meniscus reaches when the differential pressure is zero.

The assemblage of coils 5 and 6 of each limb of the manometer is connected as one arm of an impedance bridge as shown in Figures 2 and 3, in which the inductances of these assemblages are represented by $L_1$ and $L_2$ respectively and their resistances by $R_1$ and $R_2$. The remaining arms of the bridge are formed by two fixed resistances $R_0$.

The circuits shown in Figures 2 and 3 differ only in the method adopted to ensure that a constant current is suplied to the bridge. In both cases alternating current of suitable frequency is supplied, but in the circuit of Figure 2 a constant voltage transformer $T_1$ is used for this purpose, whilst in the circuit of Figure 3, the current is regulated by a barretter Br.$T_2$ (Figure 2) and $T_4$ (Figure 3) indicate step-down transformers of such a ratio that the voltage across the bridge is reduced to the required value.

The D. C. resistances of the assemblages of coils 5 and 6 of the two limbs of the manometer may differ slightly and one or both of the resistances $R_1$ and $R_2$ may also include an adjustable resistance inserted to restore the balance of the bridge. Alternatively, such adjusting resistance may be included as part of one of the resistances $R_0$.

In operation, the bridge is balanced when the differential pressure is zero or has any arbitrarily chosen value. As the differential pressure increases, the mercury will rise in one limb of the manometer and fall in the other so that the impedance of the coils 5 and 6 of one arm will rise and that of the coils 5 and 6 of the other arm will fall. This causes an unbalance of the bridge and a current will flow through the detector instrument G, the magnitude of this current depending on the difference between the mercury levels in the two limbs and hence on the differential pressure. The detector G may be calibrated in cms. of mercury pressure, or where the manometer is associated with a flow-metering device in the appropriate units of flow.

I claim:

1. Apparatus for the determination of the position of an unloaded mercury meniscus within a non-metallic container with reference to a predetermined level therein comprising a coil surrounding said container carrying an alternating current, a second smaller coil surrounding said first-mentioned coil adjacent said predetermined level and connected in series therewith, whereby the sensitivity of the apparatus is increased when the meniscus of the mercury column is at said level increased, and means for measuring impedance of said coils as a measure of changes in the distance of the meniscus from said predetermined level.

2. Apparatus for the determination of the position of an unloaded mercury meniscus within a non-metallic container with reference to a predetermined level therein comprising a coil surrounding said container carrying an alternating current, a second smaller coil surrounding said first-mentioned coil adjacent said predetermined level and connected in series therewith, whereby the sensitivity of the apparatus is increased when the meniscus of the mercury column is at said level increased, an iron wire disposed coaxially within said container, and means for measuring changes in the impedance of said coils with changes in the distance of the meniscus from said predetermined level.

3. Apparatus for measuring a differential pressure comprising a differential unloaded mercury manometer each limb of which is of non-magnetic material, an assemblage of coils surrounding each limb of said manometer, each said assemblage consisting of a coil surrounding said limb and a second smaller coil surrounding said first-mentioned coil adjacent a predetermined mercury meniscus point and connected in series therewith, iron wires disposed coaxially within each said limb, means for supplying an alternating current to each of said assemblages of coils and means for measuring changes of the impedances of said assemblages of coils with changes in the relative positions of the mercury menisci in the limbs of said manometer, caused by changes in the differential pressure.

4. Apparatus according to claim 3 wherein said assemblages of coils are connected in opposite branches of an impedance bridge arranged to be balanced when the differential pressure is at a predetermined value, whereby the value of the out-of-balance current in the galvanometer arm of the bridge is a measure of the differential pressure.

References Cited in the file of this patent
UNITED STATES PATENTS

| Number | Name | Date |
| --- | --- | --- |
| 1,331,065 | Herz | Feb. 17, 1920 |
| 2,266,608 | Kuehni | Dec. 16, 1941 |
| 2,564,221 | Hornfeck | Aug. 14, 1951 |